INVENTOR
MORTON BEROZA

BY R. Hoffman
ATTORNEY

United States Patent Office
3,230,046
Patented Jan. 18, 1966

3,230,046
APPARATUS AND METHOD FOR ULTRAMICRO DETERMINATION OF THE CARBON SKELETON AND OTHER STRUCTURAL FEATURES OF ORGANIC COMPOUNDS
Morton Beroza, 821 Malta Lane, Silver Spring, Md.
Filed Oct. 29, 1962, Ser. No. 233,979
14 Claims. (Cl. 23—230)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to a new apparatus and method that can be used to identify rapidly in microgram amounts the carbon skeleton and other structural features of a wide variety of organic compounds.

It has been shown that sulfur, nitrogen, oxygen and halogen atoms are cleaved from carbon atoms and are replaced with hydrogen atoms and unsaturated bonds are saturated in a special apparatus consisting of an aluminum reaction tube packed with a catalyst, a furnace for maintaining the tube at the desired temperature, a motor-driven syringe for charging quantities of pure compounds at about 1 μl. per mintue, and a stainless-steel tube cooled in liquid nitrogen or Dry Ice. See Thompson et al., Analytical Chemistry, vol. 32, pages 424–430, 1762–1765 (1960) and vol. 34, pages 151–156 (1962). The trapped hydrocarbon is taken up in a minimum amount of solvent and determined by gas chromatography. The solvent, which masks part of the elution pattern, is selected to avoid interference with the products of the chromatography.

One object of the present invention is to provide an apparatus which is much simpler to operate, and which gives analyses much faster. Another object is to provide an apparatus which requires no cold traps or baths, no transfers, and no constant-drive syringe. Still another object is to provide an apparatus which can analyze $C_1$ to $C_4$ hydrocarbons (which are too volatile to trap by the regular procedure of Thompson et al.) with no special techniques or auxiliary equipment. A further object is to provide an appartus which is so sensitive that it is capable of analyzing as little as a microgram (about 0.001 microliter) or less per determination. Another object is to provide an apparatus that gives information on chemical structure in addition to information on the carbon skeleton. Still a further object is to provide novel catalysts which extend the usefulness of the hereindescribed techniques.

The above objects and others which will become apparent to those skilled in the art are accomplished by the apparatus described below and in the accompanying drawings in which:

FIGURE 5 is a schematic representation of the apparatus of FIGURE 1, molified to be able to prepare and recover a sufficient amonut of the product produced in the catalyst tube for use in other procedures, e.g., for determining infrared spectra and the like.

In general, the apparatus comprises a hydrogen supply source maintained at a definite pressure or flow rate, injection port, catalyt tube, chromatographic column, and detector (usually a flame ionization detector with electrometer and recorder to record the signal from the effluent). Means for heating the various elements are provided. The appartus may be made from a flame ionization gas chromatograph using hydrogen as its carrier gas by inserting a heated catalyst-containing tube between its injection port and chromatographic column. Hydrogen, sweeping past the injected sample in the hot catalyst, saturates multiple bonds and replaces halogen, oxygen, sulfur, nitrogen, and other elements in the compound. Furthermore, as shown in Tables I and II, below, the samples also undergo hydrogenolysis. The resulting hydrocarbon passes into the chromatographic column and is identified by its elution time. The main products are either the parent hydrocarbon and/or the next lower homolog. The shape of the elution pattern reflects the ease or difficulty of converting the compound to the hydrocarbon. Breakdown products give additional information on the injected compound. These data help determine the carbon skeleton of the compound and often the position of functional groups. Acids, anhydrides, aldehydes, amides, amines, epoxides, esters, ethers, halides, ketones, sulfides, and other compounds have been analyzed with the new apparatus.

Figure 1:
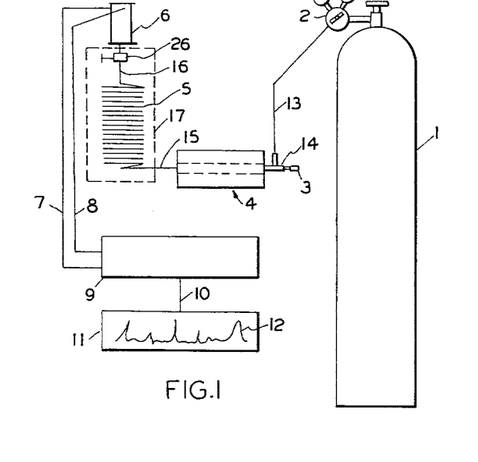
FIGURE 1 is a schematic representation of the completely assembled apparatus.

More partciularly, as shown schematically in FIGURE 1, the apparatus comprises a source of hydrogen, as for example, tank 1, connected through pressure regulator valve 2 and tube 13 to a compression "T" fitting 14 which serves as the inlet for the hydrogen and also carries injection port 3 through which the sample to be analyzed is injected into the catalyst assembly 4. The conventional injection syringes used with the flame ionization gas chromatographs mentioned in the preceding paragraph are generally longer than the injection port. Thus, the sample is injected directly into the catalyst contained in tube 18. The outlet end of catalyst assembly 4 is connected by means of tube 15 directly to one end of chromatographic column 5, thus allowing a minimum of dead space between the outlet of the catalyst tube and column 5, the other end of the latter being connected by means of tube 16 to detector 6. As those familiar with gas chromatography will understand, detection of effluent from column 5 can be accomplished by means of a conventional flame ionization detector 6 which is usually connected by means of circuit 7–8 to electrometer 9 which measures the change in conductivity through the flame caused by ionization of effluent gases from chromatographic column 5. The signal from electrometer 9 is fed via line 10 to a recorder 11, which makes a continuous plot of conductivity versus time. A typical chart is represented by 12 in FIGURE 1.

The chromatographic column 5, flame ionization detector 6, electrometer 9, and recorder 11 are all conventional items with which those skilled in the art are familiar, are commercially available, and are connected together in a known manner. Therefore, for purposes of simplicity, these elements have been shown schematically. The usual housing which encloses column 5 is indicated by 17 in dotted lines.

Figure 2:
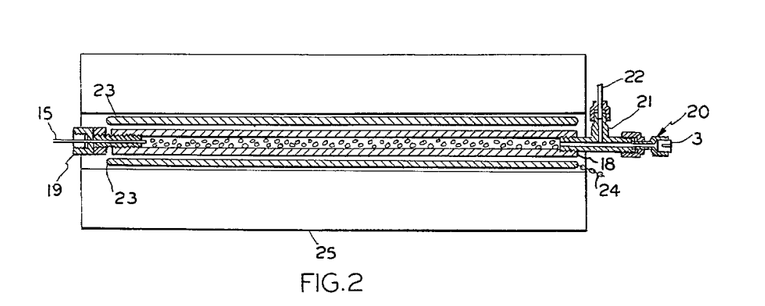
FIGURE 2 is a cross section of the catalyst-containing unit.

The catalyst assembly, indicated generally by 4 in FIGURE 1, is shown in detail in FIGURE 2.

This assembly comprises a 9½-inch-long aluminum tube 18 with ½-inch O.D. and ⅛- to 3/16-inch I.D., which is screwed onto the usual injection port of the gas chromatograph by means of fitting 19 (bolt, nut, and stainless steel tube being silver soldered together). The catalyst charge is placed in tube 18. A compression "T" fitting 21 holds the injection port assembly 20 and the hydrogen gas inlet 22. Lead washers, not shown (useful up to 290° C.), are used to make the fitting 19 and the injection port gas tight. The temperature of the catalyst tube, determined by a thermocouple (not shown) embedded 1½ inches from the end of the tube holding fitting 19, is regulated by a heating jacket 23 made by wrapping nickel-chromium resistance wire over asbestos tape on a glass tube, the ends of the wire 24 being connected to a variable transformer (not shown). An appropriate length of magnesia pipe insulation 25, coated with an asbestos cement to prevent shredding, covers the heating jacket. The insulation is cut in half longitudinally for quick disassembly. As shown in FIGURE 2, one half of the insulation is removed to expose the interior of the catalyst assembly.

Mainly two gas chromatograph columns were used. One was an 8-foot, ⅛-inch O.D. stainless steel column containing 5% silicon gum [General Electric Co. SE–30] on 60–80 mesh acid-washed diatomaceous earth. The other was a 15-foot, 3/16-inch O.D. copper column containing 5% squalane on 60–80 mesh acid-washed diatomaceous earth. Any column capable of separating the hydrocarbons may be used.

Three types of catalyst, designated as acid, neutral, and alkaline, were employed:

A. *Acid.*—A solution of palladium chloride in 5% aqueous acetic acid or platinic chloride in water (or other metal salt in solution) is evaporated to dryness in contact with a 60- to 80-mesh catalyst support on a Rinco rotating evaporator or by stirring in a beaker and then dried at 110° C. The dried powder is packed in the aluminum tube, thus providing a minimum of dead space, and hydrogen gas passed slowly through the tube (not attached to the chromatographic column) for 30 minutes while the tube is maintained at 125° C. and for 30 minutes at 200° C. The hydrogen should be vented into a hood. For analytical purposes catalysts were used for 2 days and then replaced regardless of amount of usage. Catalysts were usually made up to contain from 1 to 5% palladium or platinum chloride (as the metal) on the support [e.g., porous glass, acid-washed diatomaceous earth, alumina].

B. *Neutral.*—Sufficient fixed (nonvolatile) alkali (e.g., sodium or potassium hydroxide or carbonate) to neutralize the anion of the metallic salt is added to the mixture of the metallic salt solution and the support. For example, to 88.8 mg. of PdCl₂ add 40 mg. of sodium hydroxide. The product is then evaporated and processed as described above under A.

C. *Alkaline.*—The catalyst is prepared as described above under B except that an excess of fixed alkali (usually a 0.2% excess based on the weight of the support) is added.

The alkaline and especially the neutral catalyst give results that, in general, are much superior to those obtained with the acid catalyst. The improved catalysts give less tailing of peaks, permit analysis of amines and amides, give products with compounds of higher molecular weight. To illustrate the latter point undecyl iodide gives undecane with neutral 1% palladium on acid-washed diatomaceous earth but no product comes through with the same catalyst if it is the acid type. Another example is tetradecanol gives tridecane on neutral palladium catalyst.

The preparation and use of palladium and platinum salts are meant to be illustrative rather than limiting. It is assumed the catalyst support used in the above preparations is neutral.

In using the apparatus, the catalyst tube is maintained at a definite temperature (usually between 125° and 290° C.) by adjusting the variable transformer (not shown) mentioned above. The chromatographic column is held at 25° C. and the hydrogen flow rate at 20 ml. per minute. About 0.02 μl. (20 μg.) of pure compound is introduced into the injection port with a microsyringe.

The injected compound, depending on its nature, reacts with the hydrogen flowing through the catalyst tube, undergoing either hydrogenation or hydrogenolysis, or both. Continuing on its way, the stream of hydrogen, now carrying the reaction products, passes through the chromatographic column where the products resulting from reaction of the injected compound are separated. Retention time on the column depends on the size and configuration of the molecule. When the substance is finally eluted, it passes with the stream of hydrogen into the flame detector. Ionization in the flame causes a sharp increase in conductivity which is measured and amplified by electrometer and recorded on the recorder chart as a peak. By marking the point on the constantly moving chart corresponding to the time the compound being investigated is injected into the catalyst assembly and noting the time when a peak appears, the time of retention on the chromatographic column is determined. It has been found that the different hydrocarbon products have characteristic peak shapes and retention times. The shape of the peak and the time serve to identify the parent compound.

Depending on the potency of the catalyst and the compound being injected, the catalyst temperature may have to be raised or lowered to achieve optimum results. In general, "dragging" or "tailing" of peaks indicates the temperature should be raised, because the retention time of peaks that drag appreciably are greater than they should be. As tailing is reduced, retention times coincide more precisely with those of the anticipated hydrocarbon.

Hydrocarbon mixtures of known composition are injected periodically to establish their retention times. Retention times of unknowns are then related to the knowns to establish identities. For most accurate work knowns are run before and after an unknown.

The examples which follow are intended to illustrate the operation of the above described apparatus. Samples of the compounds to be analyzed (about 0.01 microliter) are injected into injection port 3 by means of a conventional gas chromatography microsyringe after the apparatus has been turned on and permitted to reach the required operating temperature.

EXAMPLE 1

This example illustrates the elution patterns of the four butyl alcohols.

Figure 4:
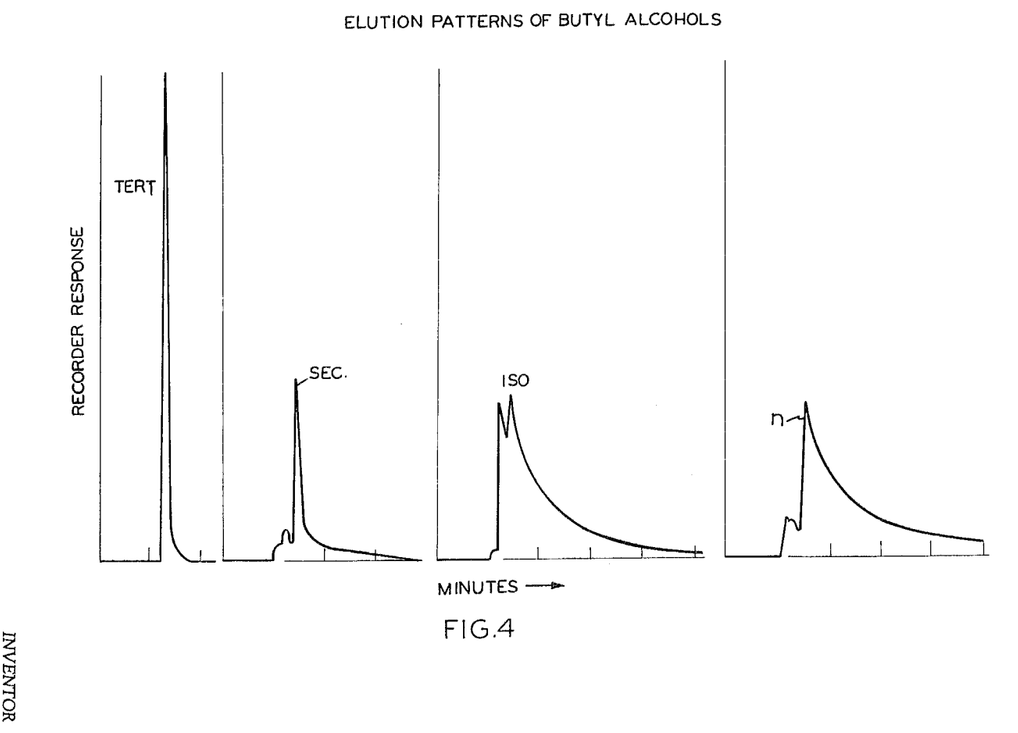
FIGURE 4 shows the elution patterns for the four butanols.

The shape of the pattern is informative. The pattern of the four butanols (FIGURE 4) subjected to acid-type 1% palladium on acid-washed diatomaceous earth illustrates this point. Tertiary butanol gives the sharpest peak at the retention time that coincides with that of isobutane. The peak of secondary butanol is not as sharp and appears at the retention time of butane. Isobutanol and normal butanol, being primary alcohols, drag most; both give propane, but the former gives some isobutane and latter butane. The four butanols are therefore readily distinguished.

EXAMPLE 2

This example relates to tests run with a variety of typical compounds from different classes.

Data obtained for specific compounds are given in Table I, while the main products obtained from each type are summarized in Table II. A compound with its functional groups replaced by hydrogens is called the "parent hydrocarbon or paraffin" in the discussion which follows.

*Table I.—Hydrocarbon products from compounds*

| Type | Compound | Principal Products [a] | Catalyst [b] and temperature, °C. |
|---|---|---|---|
| Anhydride | $[(CH_3)_2CHC(O)]_2O$ | $C_3$ | 1% Pd-GCP, 260. |
| | $[CH_3CH_2CH_2C(O)]_2O$ | $C_3$ | 1% Pd-GCP, 260. |
| Acid | $CH_3CH_2COOH$ | $C_2$ | 1% Pd-PG, 265. |
| | $CH_3CH_2CH_2COOH$ | $C_3$ | 1% Pd-PG, 265. |
| | $(CH_3)_2CHCH_2COOH$ | iso-$C_4$ | 1% Pd-PG, 265. |
| | $CH_3(CH_2)_3COOH$ | $C_4$ | 1% Pd-PG, 265. |
| | $CH_3(CH_2)_4COOH$ | $C_5$ | 1% Pd-PG, 265. |
| | $(CH_3)_2CH(CH_2)_2COOH$ | iso-$C_5$ | 1% Pd-PG, 265. |
| Acid | ⟨ ⟩—COOH | ⟨S⟩ | 1% Pd-GCP, 250. |
| | ⟨S⟩—CH₂COOH | ⟨S⟩—C | 1% Pd-GCP, 250. |
| | ⟨ ⟩(—COOH)(—COOH) | ⟨S⟩ | 1% Pd-GCP, 250. |
| Alcohol | $(CH_3)_2CHOH$ | $C_3$ | 1% Pd-GCP, 265. |
| | $CH_3CH_2CH_2OH$ | $C_2$ | 1% Pd-GCP, 265. |
| | $(CH_3)_3COH$ | iso-$C_4$ | 1% Pd-PG, 265. |
| | $CH_3CH_2CHOHCH_3$ | $C_4$ | 1% Pd-PG, 265. |
| | $(CH_3)_2CHCH_2CH_2OH$ | iso-$C_4$, iso-$C_5$ | 5% Pt-PG, 210. |
| | $CH_3(CH_2)_4OH$ | $C_4$, $C_5$ | 5% Pt-PG, 210. |
| | $CH_3CH=CH—CH=CH—CH_2OH$ | $C_5$, $C_6$ | 1% Pd-GCP, 260. |
| | $CH_3CH_2CH_2CHOHCHCH_2OH$ with $C_2H_5$ branch | $C_7$ | 1% Pd-GCP, 260. |
| | $CH_3(CH_2)_7OH$ | $C_7$ | 1% Pd-GCP, 260. |
| | $CH_3(CH_2)_8OH$ | $C_8$ | 1% Pd-GCP, 250. |
| | ⟨S⟩—OH | ⟨S⟩ | 1% Pd-GCP, 250. |
| | ⟨ ⟩—CH₂OH | ⟨S⟩ | 1% Pd-GCP, 250. |
| | ⟨ ⟩—CH₂CH₂OH | ⟨S⟩—C | 1% Pd-GCP, 250. |
| | ⟨ ⟩—CHCH₃ with OH | ⟨S⟩—C₂ | 1% Pd-GCP, 250. |
| Aldehyde | $(CH_3)_2CHCHO$ | $C_3$ | 1% Pd-PG, 265. |
| | $CH_3CH_2CH_2CHO$ | $C_3$ | 1% Pd-PG, 265. |
| | $CH_3CH=CHCHO$ | $C_3$ | 1% Pd-PG, 265. |
| | $CH_3CH_2CH_2CH(CH_3)CHO$ | $C_5$ | 1% Pd-PG, 265. |
| | $CH_3(CH_2)_5CHO$ | $C_6$ | 1% Pd-PG, 265. |
| Amide [c] | $CH_2=CH—C(O)—NH_2$ | $C_3$ [d] | 5% Pt-PG, 210. |
| | $CH_3CH_2C(O)—NH_2$ | $C_3$ [d] | 5% Pt-PG, 210. |
| | $C_3H_7C(O)NH_2$ | $C_3$, $C_4$ | 5% Pt-PG, 210. |
| | $CH_3CHClCH_2C(O)NH_2$ | $C_3$, $C_4$ | 5% Pt-PG, 210. |
| | $(CH_3)_2C=CH—C(O)—N(C_2H_5)_2$ | $C_2$, iso-$C_4$, iso-$C_5$ | 5% Pt-PG, 210. |

See footnotes at end of table.

Table I.—Hydrocarbon products from compounds—Continued

| Type | Compound | Principal Products [a] | Catalyst [b] and temperature, °C. |
|---|---|---|---|
| Amine | $C_2H_5NH_2$ | $C_2$ | 5% Pt-PG, 210. |
| | $\overline{CH_2CH_2NH}$ | $C_2$ | 5% Pt-PG, 210. |
| | $(C_2H_5)_3N$ | $C_2$ | 5% Pt-PG, 210. |
| | $(CH_2=CH-CH_2)_2NH$ | $C_3$ | 5% Pt-PG, 210. |
| | $(CH_3)_3CNH_2$ | iso-$C_4$ | 5% Pt-PG, 210. |
| | $(CH_3)_2CHCH_2NH_2$ | iso-$C_4$ | 5% Pt-PG, 210. |
| | $C_4H_9NH_2$ | $C_4$ | 5% Pt-PG, 210. |
| | $(CH_3)_2CHCH_2CH_2NH_2$ | iso-$C_5$ | 5% Pt-PG, 210. |
| | $\overline{CH_2CH_2CH_2CH_2CH_2NH}$ | $C_5$ | 5% Pt-PG, 210. |
| Ester | $C_3H_7O\overset{O}{\underset{\|}{C}}(CH_2)_5CH_3$ | $C_3$ | 1% Pd-PG, 250. |
| | $C_4H_9O\overset{O}{\underset{\|}{C}}-C_6H_{13}$ | $C_4$ | 1% Pd-PG, 250. |
| | $(CH_3)_2CHCH_2CH_2O\overset{O}{\underset{\|}{C}}H$ | iso-$C_5$, iso-$C_4$ | 1% Pd-GCP, 260. |
| | $CH_3CH_2CH_2CH=CHCH_2O\overset{O}{\underset{\|}{C}}CH_3$ | $C_6$ | 1% Pd-GCP, 250. |
| | $C_7H_{15}O\overset{O}{\underset{\|}{C}}CH_3$ | $C_7$ | 1% Pd-GCP, 260. |
| | $C_7H_{15}O\overset{O}{\underset{\|}{C}}(CH_2)_4CH_3$ | $C_7$ | 1% Pd-GCP, 260. |
| | ⌬—O$\overset{O}{\underset{\|}{C}}$CH₃ | ⌬S [d] | 1% Pd-GCP, 250. |
| | ⌬—CH₂CH₂O$\overset{O}{\underset{\|}{C}}$CHOHCH₃ | ⌬S—$C_2$ [d] | 1% Pd-GCP, 250. |
| Ether | $CH_2=CHOCH_2CH=CH_2$ | $C_3$, $C_2$ | 1% Pd-GCP, 260. |
| | $(CH_3CH_2CH_2CH_2)_2O$ | $C_4$ | 1% Pd-PG, 260. |
| | $[(CH_3)_2CHCH_2CH_2]_2O$ | iso-$C_5$ | 1% Pd-PG, 260. |
| | $[CH_3(CH_2)_6]_2O$ | $C_7$, $C_6$ | 1% Pd-GCP, 260. |
| | ⌬(Br)—OCH₃ | ⌬S [d] | 1% Pd-GCP, 260. |
| Halide | $CH_3CH_2Br$ | $C_2$ | 1% Pd-PG, 187. |
| | $CH_3CCl(CH_3)CH_3$ | iso-$C_4$ | 1% Pd-PG, 187. |
| | $CH_3(CH_2)_3Br$ | $C_4$ | 1% Pd-PG, 187. |
| | $(CH_3)_2CHCH_2CH_2Br$ | iso-$C_5$ | 1% Pd-PG, 187. |
| | $CH_3(CH_2)_7Br$ | $C_8$ | 1% Pd-GCP, 200. |
| | ⌬—CH₂Cl | ⌬S—C | 1% Pd-GCP, 250. |
| | ⌬—CH₂CH₂Br | ⌬S—$C_2$ | 1% Pd-GCP, 250. |
| | ⌬—CH₂CH₂CH₂Cl | ⌬S—$C_3$ | 1% Pd-GCP, 250. |
| Ketone | $CH_3CH_2COCH_3$ | $C_4$ | 5% Pt-PG, 210. |
| | $CH_3CH(CH_3)COCH_3$ | iso-$C_5$ | 1% Pd-PG, 260. |
| | $CH_3(CH_2)_5COCH_3$ | $C_8$ | 1% Pd-PG, 260. |
| Phenol | ⌬—OH | ⌬S | 1% Pd-PG, 260. |
| | ⌬(Br)—OH | ⌬S | 1% Pd-PG, 260. |
| Sulfide | $CH_3(CH_2)_3SH$ | $C_4$ | 1% Pd-PG, 260. |
| | $[(CH_3)_3C]_2S_2$ | iso-$C_4$ | 1% Pd-PG, 260. |
| | $[CH_3(CH_2)_4]_2S$ | $C_5$ | 1% Pd-PG, 260. |
| | ⌬—S—⌬ | ⌬S | 1% Pd-PG, 260. |

See footnotes at end of table.

*Table I.—Hydrocarbon products from compounds—Continued*

| Type | Compound | Principal Products [a] | Catalyst [b] and temperature, °C. |
|---|---|---|---|
| Others | $CH_2\text{—}CHCH_2Cl$ (epoxide) | $C_3$ | 5% Pt-PG, 210. |
| | $C_4H_9\overset{O}{\underset{O}{S}}C_4H_9$ | $C_4$ | 1% Pd-GCP, 260. |
| | $CH_3\underset{CH_3}{\overset{CH_3}{C}}\text{—}CH=\overset{CH_3}{C}\text{—}CH_3$ | $C\text{—}\underset{C}{C}\text{—}C\text{—}\underset{}{C}\text{—}C$ | 1% Pd-PG, 202. |
| | ⬡ (benzene ring) | ⬡S | 1% Pd-GCP, 250. |
| | ⬡—SCN | ⬡S | 1% Pd-GCP, 250. |
| | ⬡—CH$_3$ | ⬡S—C | 1% Pd-GCP, 250. |
| | ⬡—CN | ⬡S, | |
| | | ⬡S—C | 1% Pd-GCP, 250. |
| | ⬡—CH$_2$CN | ⬡S—C$_2$, | |
| | | ⬡S—C | 1% Pd-GCP, 250. |

[a] $C_1$ and $C_2$ were not readily distinguished in the above analyses because retention times were too close. The decision as to the product was based on results with higher homologs.
[b] Pd=palladium, Pt=platinum, GCP=diatomaceous earth, PG=porous glass.
[c] Solid amides injected in methylene chloride, preventing $C_1$ and $C_2$ observation.
[d] Identity of lower hydrocarbons not determined.

*Table II.—Hydrocarbons obtained from various classes of compounds*

| Type | Formula | Principal Product(s) |
|---|---|---|
| Paraffin hydrocarbons | $RCH_2CH_2CH_3$ | $RCH_2CH_2CH_3$. |
| Unsaturates | $RCH=CHR', RC\equiv CR'$ | $RCH_2CH_2R'$. |
| Halides | $RX, R'X_2$, etc. | $RH, R'H_2$. |
| Sulfides | $RSH, R'SSR', R''_2S$ | $RH, R'H, R''H_2$. |
| Esters | $RCH_2O\overset{O}{\overset{\|}{C}}R'$ | $RCH_3, [R'H]$ [a]. |
| Epoxides | $RCH\text{—}CH_2$ (with O bridge) | $RCH_2CH_3$. |
| Aldehydes | $RCHO$ | $RH, RCH_3$. |
| Alcohols, tertiary | $RR'R''COH$ | $RR'R''CH$. |
| Alcohols, secondary | $RR'CHOH$ | $RR'CH_2$. |
| Alcohols, primary | $RCH_2OH$ | $RH, RCH_3$. |
| Ketones | $R\overset{O}{\overset{\|}{C}}R'$ | $RCH_2R'$. |
| Ethers | $RCH_2OCH_2R'$ | $RH, R'H, RCH_3, R'CH_3$. |
| Acids | $RCOOH$ | $RH$ [a]. |
| Anhydrides | $(RCO)_2O$ | $RH$ [a]. |
| Amines | $RR'R''N$ | $RH, R'H, R''H$. |
| Amides | $RCONR'R''$ | $RCH_3, RH, R'H, R''H$. |

[a] Obtainable with freshly reduced 1% palladium on diatomaceous earth at 260° or 5% platinum on porous glass at 210°. Parent hydrocarbon of acid moiety is obtained with platinum catalysts.

Figure 3:
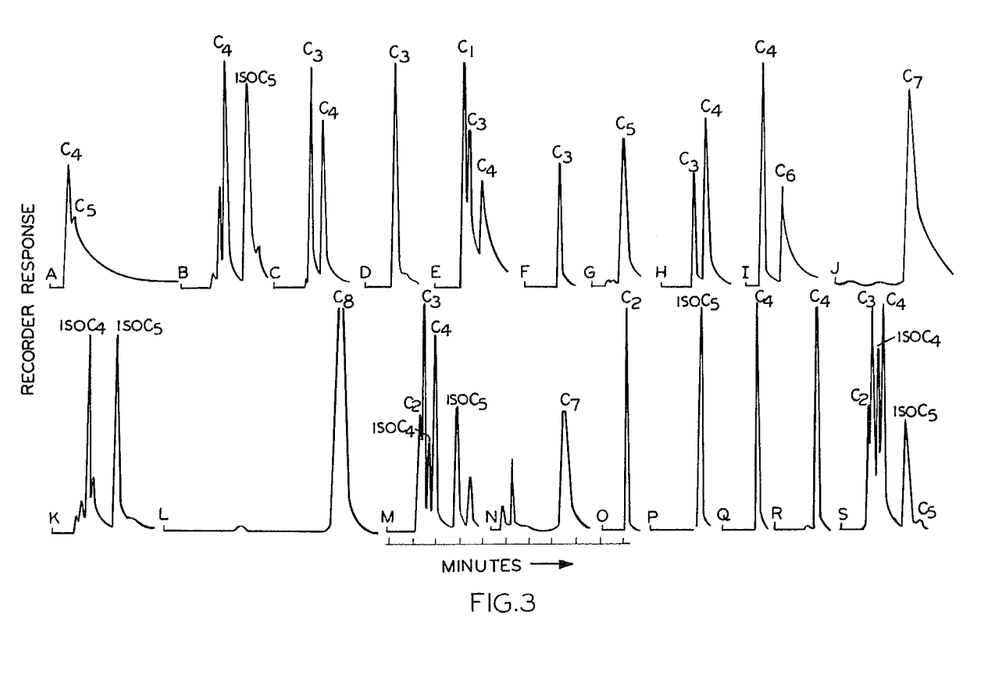
FIGURE 3 is a chart showing typical elution patterns obtained for different types of compounds tested.

Typical patterns obtained with the apparatus are shown in FIGURE 3. These patterns are identified in Table III.

Table III.—Typical elution patterns shown in FIGURE 3

| Pattern | Type | Compound | Catalyst [a] and temperature, °C. | Column |
|---|---|---|---|---|
| A | Acid | $CH_3(CH_2)_3COOH$ | 1% Pd-GCP, 260 | SE-30. |
| B | Alcohol | $CH_3CH_2CH(CH_3)CH_2OH$ | 5% Pt-PG, 210 | Sq. |
| C | Aldehyde | $CH_3CH_2CH_2CHO$ | 5% Pt-PG, 210 | Sq. |
| D | Anhydride | $[(CH_3)_2CH\overset{O}{\overset{\|}{C}}]_2O$ | 1% Pd-GCP, 260 | Sq. |
| E | Amide | $CH_3CHClCH_2\overset{O}{\overset{\|}{C}}NH_2$ in $CH_2Cl_2$ | 5% Pt-PG, 210 | Sq. |
| F | Amine | $(CH_3CH_2CH_2)_2NH$ | 5% Pt-PG, 210 | Sq. |
| G | Amine, cyclic | $\overline{CH=CH-CH=CH-CH=N}$ | 1% Pt-Pg, 160 | SE-30. |
| H | Epoxide | $\overset{O}{\overset{/\backslash}{CH_2\text{—}CHCH_2CH_3}}$ | 5% Pt-PG, 210 | Sq. |
| I | Ester | $C_4H_9O\overset{O}{\overset{\|}{C}}(CH_2)_6CH_3$ | 1% Pd-GCP, 260 | SE-30. |
| J | ___do___ | $C_7H_{15}O\overset{O}{\overset{\|}{C}}CH_3$ | 1% Pd-GCP, 260 | SE-30. |
| K | Ether | $[(CH_3)_2CHCH_2CH_2]_2O$ | 5% Pt-PG, 210 | Sq. |
| L | Halide | $C_8H_{17}Br$ | 1% Pd-GCP, 260 | SE-30. |
| M | Halide mixture | $C_2H_5Br$, $C_3H_7I$, $(CH_3)_2CHCH_2Br$, $C_4H_9Br$, $(CH_3)_2CHCH_2CH_2Br$, $C_5H_{11}Br$ | 5% Pt-PG, 210 | Sq. |
| N | Ketone | $CH_3(CH_2)_4\overset{O}{\overset{\|}{C}}CH_3$ | 1% Pd-GCP, 260 | SE-30. |
| O | Sulfide | $C_2H_5SH$ | 1% Pd-PG, 260 | Sq. |
| P | Sulfide, di- | $[(CH_3)_2CH_2CH_2CH_2]_2S_2$ | 1% Pd-PG, 260 | Sq. |
| Q | Sulfide, cyclic | $\overline{CH_2CH_2CH_2CH_2S}$ | 1% Pd-PG, 260 | Sq. |
| R | Unsaturate | $ClCH_2C\equiv CCH_2Cl$ | 1% Pd-GCP, 260 | Sq. |
| S | Amine mixture | $C_2H_5NH_2$, $(C_3H_7)_2NH$, $(CH_3)_2CHCH_2NH_2$, $C_4H_9NH_2$, $(CH_3)_2CHCH_2CH_2NH_2$, $C_5H_{11}NH_2$ | 5% Pt-PG, 210 | Sq. |

[a] Pd=palladium, Pt=platinum, GCP=diatomaceous earth, PG=porous glass.

Halogenated aliphatics give the parent paraffins at the proper retention times so smoothly that they are useful as standards for comparison when certain hydrocarbons are not available for comparison purposes. For example, methylene chloride, ethyl bromide, and propyl iodide were used to establish retention times of methane, ethane, and propane. Peaks showed practically no tailing. See FIGURES 3-L, M. Unsaturated compounds are saturated (FIGURE 3-R).

Sulfides give the parent paraffins as sharp peaks, with very little tailing, at the proper retention times (FIGURES 3-O, P, Q). Platinum catalysts are poisoned by sulfides and are therefore not used with these compounds.

Esters yield the parent paraffin of the alcohol moiety. If the alcohol is primary, the hydrocarbon of the alcohol less its $-CH_2OH$ group is also obtained if the temperature is high enough. A dragging peak corresponding to the decarboxylated acid and appearing in small amount (compared to the alcohol peak(s)) may also be obtained, e.g., with acid-type 1% palladium on acid-washed diatomaceous earth. See FIGURE 3-I. The same catalyst after long usage did not produce a peak from the acid portion (FIGURE 3-J). In some cases the parent hydrocarbon of the acid will appear (e.g., on 5% platinum on porous glass). Peaks due to acids are readily distinguishable from the peak or peaks of the alcohol portion of the ester because the acid peaks tail or drag much more. The peaks of the acid are the first to disappear when the temperature of the catalyst is lowered. Peaks due to the acid portion did not appear on acid catalysts when alumina was the support.

Aldehydes give the parent hydrocarbon, but mainly the hydrocarbon corresponding to the original compound less the CHO group. There is practically no dragging of this peak and retention times are accurate. FIGURE 3-C is typical.

Alcohols yield the parent paraffin. Primary alcohols also give the hydrocarbon of the alcohol less the $-CH_2OH$ group; if the peaks drag and the retention times are slightly greater than they should be, the catalyst temperature may be elevated (FIGURE 3-B). If the temperature is too high, the parent paraffin of primary alcohols may become very small.

Ketones give the parent hydrocarbons, but the peaks drag frequently and their retention times are slightly late. Higher temperatures are needed to get good agreement between retention time of the product and the known (FIGURE 3-N).

Ethers likewise give the anticipated hydrocarbons, but they drag and the peaks are late when temperatures are too low. Higher temperatures minimize the lateness of the peaks but cause some of the next lower homolog of primary ethers to appear, i.e., the homolog with the carbon attached to the oxygen removed. See FIGURE 3-K.

Acids are the most polar of the oxygenated compounds tested. The highest temperatures (265° with palladium catalysts) are required to get a weak peak, and it tails considerably. Nevertheless, the results are definite and the hydrocarbon corresponding to the decarboxylated acid is the main product. The acid-type 1% palladium on diatomaceous earth, freshly reduced, gives good results for the acids (FIGURE 3-A).

Anhydride peaks are sharp and appear at the retention times for the hydrocarbon of the decarboxylated acid with acid-type 1% palladium on diatomaceous earth at 260° (FIGURE 3–D).

Amines and amides will not pass acid palladium catalysts and are best analyzed on neutral or alkaline palladium or platinum catalysts. See FIGURES 3–E, F, G, S.

Ideally for determining skeletal structure, a compound should react instantly and the retention time of the resulting paraffin should be the same as that which would be obtained if the paraffin were itself injected. Practically, it is only necessary to reduce the time delay incurred in the catalyst tube so that the retention time of the peak is distinguishable from that of the next-eluted possibility. Resolution may be controlled by proper selection of catalyst support. With 60–80 mesh supports, resolution was as good as that obtained when compounds were injected directly into the chromatograph (i.e., without going through the catalytic chamber). Finer mesh sizes may be used if the particles are uniform in size and are not so fine that the gas flow is unduly impeded. Good resolution is essential in the present procedure for distinguishing between peaks with similar retention times and for disclosing small differences in elution patterns.

The use of higher catalyst temperatures or more potent catalysts puts stress on the compounds and fragmentation often ensues, giving new peaks at lower retention times. One may deliberately fragment compounds, such as esters and ethers, to learn more about their structure. For example, if the alcohol portion of an ester yields 2,2,3-trimethylbutane, the question arises as to the point of attachment of the oxygen. There are three possibilities for the original structure:

I is a tertiary ester and is readily distinguishable from II and III by the sharp elution peak of the alcohol hydrocarbon obtained with acid-type 1% palladium on acid-washed diatomaceous earth, the width being no greater than that given by a hydrocarbon of similar or same retention time. The peaks from II and III will drag some, as all primary alcohol esters do, but more significant—when the catalyst temperature is raised and causes the molecules to fragment, the hydrocarbons arising from the alcohols less the $CH_2OH$ groups are different and are distinguishable by their retention times:

The dimensions of the apparatus are not critical. Bore diameters of catalyst tube 18 of from 1/8 to 3/16 inch gave good results. The heating jacket 23 is well insulated and the catalyst can be brought to temperature in 15 to 20 minutes. Removal of the insulation permits rapid cooling of the catalyst. Disassembly of the apparatus to change the catalyst is rapid.

A convenient arrangement of the apparatus provides for a two-way valve or outlet (not shown) immediately after the catalyst tube. One valve position allows venting of the hydrogen during activation of the catalyst; the other permits the hydrogen to flow into the chromatographic column.

Figure 5:
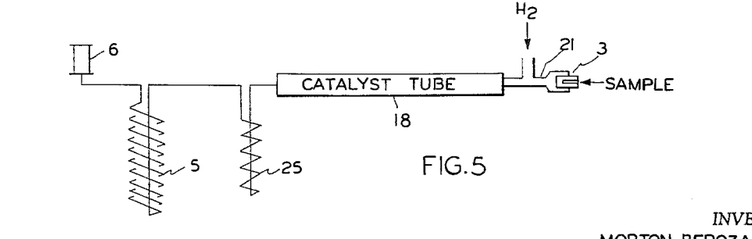

A modification of the apparatus, useful for preparing sufficient compound for whatever purpose, e.g., for determining an infrared spectrum, is shown in FIGURE 5. It is also useful to eliminate tailing of a compound. The same apparatus is used except that a trap 25 is interposed between the exit of the hot catalyst tube 18 and the chromatographic column 5. With the trap immersed in a cold bath, e.g., Dry Ice acetone (not shown), the sample is injected slowly into the system; the cold trap holds the product until the injection is completed. The cold bath is then replaced by a boiling-water bath or otherwise rapidly heated, which causes the trapped product to move through the chromatographic column. The exiting product(s) may be collected at the appropriate time or a small portion of the effluent may be passed through a flame ionization detector to indicate the proper time for collection of products. In an alternative arrangement the effluent (if enough is obtained) could be passed directly through a detector that does not destroy the product (e.g., gas-density or thermal conductivity detector). It has been found desirable to trap the fractions on the same packing used in the chromatographic columns.

The apparatus of FIGURE 5 is useful for accomplishing high-speed hydrogenations and hydrogenolysis reactions. If done on a large scale, exiting hydrogen can be recovered and reused.

Still another modification of the apparatus also permits the preparation of larger amounts of hydrocarbons. This modification involves merely substituting a catalyst tube of greater inside diameter than the one described in connection with FIGURE 1. Thus, a catalyst tube of about 3/8-inch inside diameter is substituted for the smaller-diameter catalyst tube. Just prior to the detector unit 6 a small bleeder valve 26 is placed. This valve is used to bleed off a small part of the effluent to the flame detector to show when the desired product is being eluted.

In one experiment, sufficient hydrocarbon for characterization was produced by a single injection of 1.0 µl. of sample, using flow rates of about 80 ml. per minute.

It will be understood that bleeder valve 26 can be made a permanent part of detector 6 to be used as described above when the larger diameter catalyst tube is used, and that the apparatus may be scaled up in size so that macro amounts can be readily handled.

The apparatus described above are meant to be illustrative rather than limiting. It is understood that variations of the devices may be made, dimensions may be changed, different detectors may be useful for preparative work and different columns may be used, without departing from the basic idea presented.

Having described my invention, I claim:

1. An apparatus of the character described comprising:
   (a) a catalyst tube having an inlet end and an outlet end packed with a catalyst having a particle size at least as fine as 60 mesh;
   (b) means for maintaining the catalyst tube at a predetermined temperature;
   (c) a port in the inlet end of the catalyst tube adapted to accommodate a microsyringe needle for injecting a chemical directly into the catalyst, said port having an inner diameter not substantially greater than the outside diameter of said microsyringe needle;
   (d) a source of hydrogen;
   (e) means for conducting hydrogen from said source to the catalyst tube at a predetermined pressure and flow rate past said port;
   (f) a chromatographic column having an inlet end and an outlet end, the inlet end thereof being connected directly to the outlet end of the catalyst tube with substantially no dead volume, the inside diameter of the catalyst tube being not substantially greater than the inside diameter of the chromatographic column; and
   (g) detecting means connected to the outlet end of the chromatographic column for detecting reaction products exiting from said column.

2. The apparatus of claim 1 in combination with a two-way valve connected between the outlet end of the catalyst tube and the inlet end of the chromatographic column, said valve being adapted, while in one position, to vent hydrogen and, while in the other position, to permit hydrogen to flow from the catalyst tube to the chromatographic column.

3. An apparatus of the character described comprising:
   (a) a catalyst tube having an inlet end and an outlet end and packed with a catalyst having a particle size at least as fine as 60 mesh;
   (b) means for maintaining the catalyst tube at a predetermined temperature;
   (c) a port in the inlet end of the catalyst tube adapted to accommodate a microsyringe needle for injecting a chemical directly into the catalyst, said port having an inner diameter not substantially greater than the outside diameter of said microsyringe needle;
   (d) a source of hydrogen;
   (e) means for conducting hydrogen from said source to the catalyst tube at a predetermined pressure and flow rate past said port;
   (f) a chromatographic column having an inlet end and an outlet end, the inlet end thereof being connected directly to the outlet end of the catalyst tube with substantially no dead volume, the inside diameter of the catalyst tube being not substantially greater than the inside diameter of the chromatographic column;
   (g) signal-generating detecting means connected to the outlet end of the chromatographic column for detecting reaction products exiting from the column;
   (h) measuring means connected to the detecting means for measuring the signal generated by said detecting means; and
   (i) recording means connected to measuring means for recording the signal.

4. The apparatus of claim 3 in combination with a two-way valve connected between the outlet end of the catalyst tube and the inlet end of the chromatographic column, said valve being adapted, while in one position, to vent hydrogen and, while in the other position, to permit hydrogen to flow from the catalyst tube to the chromatographic column.

5. The apparatus of claim 3 wherein the detecting means is a flame ionization detector and the measuring means is an electrometer.

6. The apparatus of claim 1 having means interposed between the catalyst tube and the chromatographic column for collecting reaction products exiting from the catalyst tube.

7. The apparatus of claim 6 wherein the detecting means is a flame ionization detector and the measuring means is an electrometer.

8. The apparatus of claim 3 having means interposed between the catalyst tube and the chromatographic column for collecting reaction products exiting from the catalyst tube.

9. The apparatus of claim 8 wherein the detecting means is a flame ionization detector and the measuring means is an electrometer.

10. A method for determining the structure of organic compounds having functional groups comprising:
    (a) injecting a sample of such an organic compound directly into a body of heated hydrogenation catalyst while passing a stream of hydrogen gas through said body of heated catalyst to remove said functional groups and produce reaction products of the group consisting of the parent hydrocarbon, the next lower homologue of said parent hydrocarbon, and fragments thereof;
    (b) passing the reaction products through a chromatographic column;
    (c) eluting the reaction products from the column with a stream of gas;
    (d) passing said stream of gas through a detecting zone to detect the presence of reaction products carried by said gas;
    (e) recording the retention time of the reaction products on said column; and
    (f) comparing said retention time with the retention time of compounds of known structure, all of the foregoing steps, except the last, taking place as a single sequential operation.

11. The method of claim 10 wherein the hydrogenation catalyst is a member of the group consisting of palladium chloride and platinic chloride on a support selected from the group consisting of porous glass, diatomaceous earth, an alumina.

12. The method of claim 11 wherein the catalyst support is of a particle size at least as fine as 60 mesh.

13. The method of claim 10 wherein the amount of organic compound is about a hundredth of a microliter or less.

14. The method of claim 11 wherein the amount of organic compound is about one-hundredth of a microliter or less.

References Cited by the Examiner

UNITED STATES PATENTS

| | | | |
|---|---|---|---|
| 1,935,188 | 11/1933 | Latshaw et al. | 252—460 |
| 2,207,868 | 7/1940 | Martin | 252—460 |
| 2,905,536 | 9/1959 | Emmett et al. | 23—232 |
| 3,027,241 | 3/1962 | Andreatch et al. | 23—254 |

FOREIGN PATENTS

| | | |
|---|---|---|
| 832,423 | 4/1960 | Great Britain. |

OTHER REFERENCES

Rowan, Jr.: Anal. Chem., 33, 658–665 (1961).
Thompson et al.: Anal. Chem., 32, 424–30 (1960).

MORRIS O. WOLK, *Primary Examiner.*

D. E. GANTZ, J. SCOVRONEK, *Assistant Examiners.*